Figure 1:
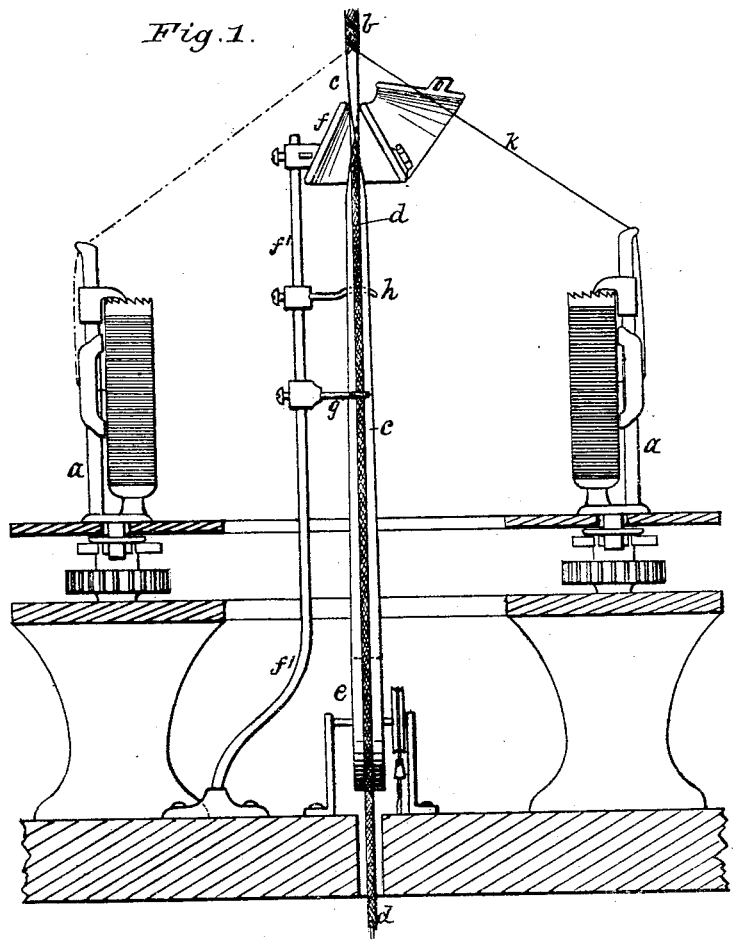

(No Model.)

E. F. PHILLIPS.
Electrical Conductor.

No. 230,653. Patented Aug. 3, 1880.

Witnesses:
Philip F. Larner
Howell Bastle

Inventor:
Eugene F. Phillips
By Wm. C. Wood
Attorney

UNITED STATES PATENT OFFICE.

EUGENE F. PHILLIPS, OF PROVIDENCE, RHODE ISLAND.

ELECTRICAL CONDUCTOR.

SPECIFICATION forming part of Letters Patent No. 230,653, dated August 3, 1880.

Application filed April 6, 1880. (No model.)

*To all whom it may concern:*

Be it known that I, EUGENE F. PHILLIPS, of the city and county of Providence, in the State of Rhode Island, have invented certain new and useful Improvements in Electric Conductors, and in machinery and methods involved in the manufacture thereof; and I do hereby declare that the following specification, taken in connection with the drawings furnished and forming a part of the same, is a clear, true, and complete description of my invention.

My improvements relate to that class of cabled or grouped insulated electric conductors which are provided with means for disposing of induced currents and preventing what are known as "crosses," which result from the traversing of electric currents from wire to wire. Heretofore to attain these ends such insulated conductors have either been jacketed in soft-metal foil or inclosed within a spiral wire, the foil and the wire being in each case grounded at requisite intervals to afford a free disposal of the induced currents from all the conductors. The spiral wire, if closely coiled, would serve a good purpose, but would add largely to the cost and weight of the cabled conductors, and if these are used for aerial lines the unnecessary weight would be objectionable, and for these reasons the metal foil has usually been employed.

As heretofore applied, the metal foil has been spiraled in strips flatly laid upon each insulated wire, and as the foil is soft and tender it is liable to be broken or otherwise so far injured by bending the conductor as a whole as to detract from the value of the foil as a special conductor for the induced currents; and one object of my invention is to so apply the foil as to reduce to a minimum the liability of breaking and otherwise injuring it.

Considered as a weather-protecting medium for the insulated wire, the foil has additional value; and therefore, while it is important to obviate breakage of the foil, it is also of consequence to reduce the extent of the lap-joints of the foil to a minimum, and that is another object of my invention.

When the foil is spirally laid upon the insulated wire the length of the lap-joint is much greater than the length of the wire, because of the convolutions, and I obviate the liability of breaking the foil when the cabled conductors are bent, and also reduce the extent of the lap-joint by applying the foil in a strip longitudinally with the wire and causing it to be laid with but one practically-straight longitudinal lap-joint, which is therefore substantially no longer than the conducting-wire. By thus laying the foil and thereafter compressing it upon the insulated covering of the conductor numerous longitudinal corrugations or creases occur in the foil, and these, by yielding to and fro when the conductor is bent, enable the foil to more successfully withstand those bending strains, which, if applied to a conductor having spirally-laid foil, would be liable to cause more or less rupture therein. The delicacy of the foil also, in practice, renders it difficult to apply it spirally, and therefore it has heretofore been sometimes strengthened with paper applied to the under side of the foil; but that involves additional cost without any corresponding benefit in the conductor when finished.

It is impracticable to revolve the conductor while laying the foil, and the delivery of the foil from spools revolving around the conductor involves greater tensile strain on the foil than it can safely stand, unless it be heavier and more costly than is really necessary for the purposes intended.

By applying the foil longitudinally in accordance with my invention no strains are involved other than those due to its weight for a short length and those due to its delivery from a well-mounted spool or drum in stationary bearings.

I do not claim, broadly, the application to insulated wire of a strip of metal longitudinal with the wire, as I am aware that a sheathing of steel, iron, or copper in strips has heretofore been applied to insulated wire and longitudinally therewith, as described in English Letters Patent No. 3,489, of A. D. 1869. That metal sheathing was, however, necessarily of sufficient weight or thickness to protect the insulating matter beneath the sheathing from being pierced by the ends of armoring-wires applied outside the sheathing, and the application of a strip of metal thick and heavy enough for that purpose involves none of the difficulties incident to the application of metal foil, which is extremely weak and delicate, and is even more easily pierced than the insulating matter beneath it.

I am the first, so far as my knowledge extends, to apply foil in the manner herein described and to demonstrate the peculiar value resulting therefrom.

In cabling foil-jacketed conductors they are necessarily handled, which renders the delicate foil liable to more or less injury, thereby impairing its value as a conductor for the induced currents; but in carrying out one feature of my invention I apply immediately to the foil-jacket a braided jacket, these two being applied practically simultaneously, whether said braided jacket be composed solely of textile fabric or metallic strands be used therein, as in what I will term the "Pearson cable."

To more particularly describe my invention, I will refer to the accompanying drawings, in which—

Figure 2:
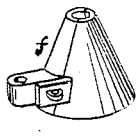
Figure 3:
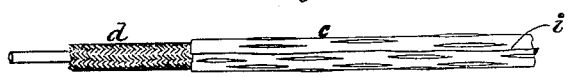
Figure 4:
Figure 5:
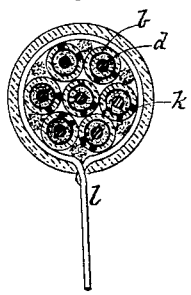

Figure 1 represents, in section, so much of a braiding-machine as is necessary for illustration, and in front view the mechanism employed by me for carrying out my invention. Fig. 2 represents, in perspective, the foil-guide detached. Fig. 3 represents a piece of insulated wire covered with foil in accordance with my invention. Fig. 4 represents a piece of foil-covered insulated wire protected with a jacket containing metallic strands. Fig. 5 represents, in section, a group or cable of my improved conductors with its ground-wire connection.

The drawings, Fig. 1, illustrate a braiding-machine in which the requisite number of bobbin-carriers $a$ are mounted for braiding the protecting-jacket $b$ upon the foil-covering $c$ of the insulated wire $d$. This jacket may be composed, in whole or in part, of metallic strands, but seldom more than two of such strands will be necessary, as in the Pearson cable, and in some cases a single strand may be relied upon, the rest of the strands being of any suitable textile fiber in the form of yarn or cord. Said metallic strands should be larger than the yarn or cord, so as to insure their occupying a prominently-exposed position on the surface of the jacket. The strip of foil $c$ is coiled upon a spool or drum, $e$, mounted directly beneath the center of the machine, and it is preferably provided with a tension-pulley, cord, and weight, as shown, to prevent irregular delivery of the foil.

A folding-guide, $f$, is mounted upon a standard, $f'$, in line with the vertical center of the machine, through which the insulated wire $d$ passes upward from a drum beneath the bench on which the machine is mounted. The folding-guide is funnel-shaped, with its small end uppermost, and to afford convenient access to its interior for correcting any temporary fault in the laying of the foil, which is liable to occur, I prefer that the guide be constructed in two equal sections, hinged together and fastened by a latch, as shown. On the standard $f'$, I also provide a wire-guide, $g$, projecting at right angles from the standard through which the insulated wire passes, so that it is always maintained in a proper central position with relation to the interior of the folding-guide. I also provide on the same standard a curved auxiliary foil-guide, $h$, which causes the flat strip of foil to commence assuming a tubular form before it reaches the foil-guide $f$.

So far as my knowledge extends, the combination, with a braiding-machine, of a device for folding a strip of any material around a wire immediately preparatory to the application of a braided jacket has never before been employed, and that combination constitutes another feature of my invention.

In operation my conductors are made as follows: The insulated wire $d$, which may embody any of the well-known types of insulation suitable for the purpose, is properly mounted on its reel below the bench or floor, and one end thereof carried upward through the machine to the feed-rolls usually employed, or to a take-up reel. (Not shown.) The foil-guide $f$ is opened, and the strip of tin-foil, preferably of such width as will encircle the wire one and a half time, but sometimes of greater width, is then properly started for forming the fold by the hand of the operative at a point at which the braided fabric will be solidly laid by the braiding-machine. One, two, or more of the bobbins of the machine are laden with fine soft copper wire $k$, and the balance of the bobbins with suitable yarn. The machine is then started. The upward movement of the wire delivers the foil from its spool, and the protecting-jacket is meantime applied above the guide $f$. The foil is not tightly laid, and therefore when the braided jacket closes down thereon it is more or less caused to crease or to be corrugated longitudinally, as illustrated in Fig. 3, which enables the conductor to be bent with a minimum of liability of rupturing the foil.

Instead of the great length of lap-seam in the foil-jacket which is present when the foil is spiraled, my lap-joint $i$ is practically straight and no longer than the wire.

If the protecting-jacket contains the metallic strands, said jacket may or may not be charged with insulating matter; but when said metallic strands are not employed it is thoroughly insulated by me. I cable the conductors both straight and spirally, as may be desirable in the service intended.

When two or more conductors having these foiled and protecting jackets are grouped or cabled within a suitable exterior jacket, the contact of the wires in the jackets with each other and with their respective foil-jackets enables a ready ground-connection, $l$, at any point by wrapping around the mass of protecting-jackets a length of wire or a metallic band, as illustrated in Fig. 5, thus avoiding all liability of injuring the foils, as heretofore.

The central bare wire heretofore employed for contact with the foil-jackets of the several conductors need not be employed with my protecting-jackets.

It is difficult, owing to varied service of lines, to predetermine in a cable at what intervals ground-connections will be required, and therefore in some cases the cables in long lengths may be provided originally with frequent ground-connections arranged therein by applying the encircling wire or bands as shown, whether the protecting-jackets next outside the foils contain the metal strands or not; but if not the foils must be bared for attaining proper contact with each other and with said band. These encircling wires or bands are provided with an end or ends which protrude from the outer or finishing jacket, with any or all of which bands full ground connection may readily be made without in any manner dissecting or cutting into the cable.

The protruding ends of wire or band are snugly coiled around the outside of the cable, and so secured as to afford no obstacle in handling and mounting the cable on poles or house-tops. When not thus embodied in the cable ground-connections are applied by cutting away, say, one inch in length of the exterior casing down to the protecting-jackets and winding thereon copper wire of proper length to afford the protruding end, after which a wide band of fabric treated with plastic water-proof material is applied, and so securely wrapped with outside wire as to constitute practically a continuation of the casing, and not to impair its tensile strength.

Having thus described my invention, I claim as new and desire to secure by Letters Patent—

1. The improvement in the manufacture of electric insulated conductors containing foil-conductors for induction-currents, which consists in applying thin delicate foil to the insulated covering of the wire in a strip longitudinal with the wire, folding the same around said covering with a straight lap-joint, and applying a braided jacket, which creases or corrugates and tightens the foil upon the insulated covering of the wire, substantially as described.

2. The improvement in the manufacture of foil-covered insulated wires which consists in the simultaneous application to an insulated wire of a foil-jacket and a protecting-jacket upon the foil, substantially as described, whereby, after the foil is laid, it is at once protected from all liability of injury, as set forth.

3. The combination, with a braiding-machine, of a foil-guide, substantially as described.

4. The electric conductor and its insulating covering, inclosed within a layer of thin metallic foil laid longitudinally upon said covering, and folded thereon with a single straight lap-joint, and further inclosed within a braided jacket, which tightens the foil upon the insulated covering and creases or corrugates it, substantially as described, whereby said foil is protected against rupture in bending the wire and presents a minimum length of lap-joint, as and for the purposes set forth.

EUGENE F. PHILLIPS.

Witnesses:
HUBERT S. TANNER,
JOHN C. PURKIS.